United States Patent [19]

Zeldin et al.

[11] Patent Number: 5,708,772
[45] Date of Patent: Jan. 13, 1998

[54] NETWORK TOPOLOGY DETERMINATION BY DISSECTING UNITARY CONNECTIONS AND DETECTING NON-RESPONSIVE NODES

[75] Inventors: Paul Zeldin, Los Altos; Ilan Raab; Suk-Lin Tsang, both of Sunnyvale, all of Calif.

[73] Assignee: Bay Networks, Inc., Santa Clara, Calif.

[21] Appl. No.: 477,285

[22] Filed: Jun. 7, 1995

Related U.S. Application Data

[63] Continuation of Ser. No. 235,661, Apr. 29, 1994, abandoned.

[51] Int. Cl.$^6$ .................................................. G06F 11/30
[52] U.S. Cl. ........................................................ 395/183.01
[58] Field of Search ........................ 395/183.01, 183.03, 395/183.13; 364/267, 284.4

[56] References Cited

U.S. PATENT DOCUMENTS

| | | | |
|---|---|---|---|
| 4,827,411 | 5/1989 | Arrowood et al. | 364/300 |
| 5,185,860 | 2/1993 | Wu | 395/200 |
| 5,226,120 | 7/1993 | Brown et al. | 395/200 |
| 5,297,138 | 3/1994 | Black | 370/60 |
| 5,321,813 | 6/1994 | McMillen et al. | 395/200 |

*Primary Examiner*—Robert W. Beausoliel, Jr.
*Assistant Examiner*—Stephen C. Elmore
*Attorney, Agent, or Firm*—Blakely, Sokoloff, Taylor & Zafman

[57] ABSTRACT

A computer-implemented method and apparatus for determining a topology of a network. Signals are received from all source hubs in the network, wherein each of the signals contains connection information for the source hubs including destination hubs to which the source hubs are coupled, and a corresponding connection port on the source hubs through which the destination hubs are coupled. The connection information is processed by locating all unitary connections in the connection information and iteratively performing certain steps until there are no more unitary connections in the connection information. Subsequently, if the connection information is not empty and there are additional unitary connections in the connection information, then the foregoing steps are repeated until there are or more unitary connections or the processed connection information is empty. The resolved connection information is then stored for a complete topology. This above topology method and apparatus is also useful in circumstances where certain source hubs are non-responsive to requests for connection information, that is, they are either malfunctioning or are hubs of an unknown or unsupported type. The connection information may be further processed to determine such non-responsive hubs and insert references to unsupported devices in the processed connection information to show these non-responsive devices in the topology.

11 Claims, 28 Drawing Sheets

Network Computing Engine (NCE)

Fig. 4a

Initial Link Table

Link Entry for N0    400

| Dest Nmm | Slot | Port |   |
|----------|------|------|---|
| N0 | 0 | 0 | ←401 |
| N2 | 2 | 1 | ←402 |
| N3 | 2 | 1 | ←403 |
| N4 | 2 | 1 | ←404 |
| N5 | 2 | 1 | ←405 |
| N1 | 4 | 1 | ←406 |

Link Entry for N1    410

| Dest Nmm | Slot | Port |   |
|----------|------|------|---|
| N1 | 0 | 0 | ←411 |
| N0 | 1 | 1 | ←412 |
| N2 | 1 | 1 | ←413 |
| N3 | 1 | 1 | ←414 |
| N4 | 1 | 1 | ←415 |
| N5 | 1 | 1 | ←416 |

Link Entry for N2    420

| Dest Nmm | Slot | Port |   |
|----------|------|------|---|
| N2 | 0 | 0 | ←421 |
| N0 | 3 | 4 | ←422 |
| N1 | 3 | 4 | ←423 |
| N3 | 2 | 2 | ←424 |
| N4 | 3 | 1 | ←425 |
| N5 | 3 | 1 | ←426 |

Link Entry for N3    430

| Dest Nmm | Slot | Port |   |
|----------|------|------|---|
| N3 | 0 | 0 | ←431 |
| N0 | 3 | 1 | ←432 |
| N1 | 3 | 1 | ←433 |
| N2 | 3 | 1 | ←434 |
| N4 | 3 | 1 | ←435 |
| N5 | 3 | 1 | ←436 |

Initial Link Tables

Link Entry for N4    440

| Dest Nmm | Slot | Port |     |
|----------|------|------|-----|
| N4       | 0    | 0    | ←441 |
| N0       | 2    | 1    | ←442 |
| N1       | 2    | 1    | ←443 |
| N2       | 2    | 1    | ←444 |
| N3       | 2    | 1    | ←445 |
| N5       | 2    | 2    | ←446 |

Link Entry for N5    450

| Dest Nmm | Slot | Port |     |
|----------|------|------|-----|
| N5       | 0    | 0    | ←451 |
| N0       | 2    | 1    | ←452 |
| N1       | 2    | 1    | ←453 |
| N2       | 2    | 1    | ←454 |
| N3       | 2    | 1    | ←455 |
| N4       | 2    | 1    | ←456 |

Fig. 5a

Link Table

Link Entry for N0          500

| Dest Nmm | Slot | Port |
|---|---|---|
| N0 | 0 | 0 | ←501
| N2 | 2 | 1 | ←502
| N3 | 2 | 1 | ←503
| N4 | 2 | 1 | ←504
| N5 | 2 | 1 | ←505

Link Entry for N1          510

| Dest Nmm | Slot | Port |
|---|---|---|
| N1 | 0 | 0 | ←511
| N0 | 1 | 1 | ←512
| N2 | 1 | 1 | ←513
| N3 | 1 | 1 | ←514
| N4 | 1 | 1 | ←515
| N5 | 1 | 1 | ←516

Link Entry for N2          520

| Dest Nmm | Slot | Port |
|---|---|---|
| N2 | 0 | 0 | ←521
| N0 | 3 | 4 | ←522
| N1 | 3 | 4 | ←523
| N4 | 3 | 1 | ←524
| N5 | 3 | 1 | ←525

Fig. 5b

Link Table

Link Entry for N3    530

| Dest Nmm | Slot | Port |   |
|---|---|---|---|
| N3 | 0 | 0 | ←531 |
| N0 | 3 | 1 | ←532 |
| N1 | 3 | 1 | ←533 |
| N2 | 3 | 1 | ←534 |
| N4 | 3 | 1 | ←535 |
| N5 | 3 | 1 | ←536 |

Link Entry for N4    540

| Dest Nmm | Slot | Port |   |
|---|---|---|---|
| N4 | 0 | 0 | ←541 |
| N0 | 2 | 1 | ←542 |
| N1 | 2 | 1 | ←543 |
| N2 | 2 | 1 | ←544 |
| N3 | 2 | 1 | ←545 |

Link Entry for N5    550

| Dest Nmm | Slot | Port |   |
|---|---|---|---|
| N5 | 0 | 0 | ←551 |
| N0 | 2 | 1 | ←552 |
| N1 | 2 | 1 | ←553 |
| N2 | 2 | 1 | ←554 |
| N3 | 2 | 1 | ←555 |
| N4 | 2 | 1 | ←556 |

Fig. 5c

Resolved Links

| Source Nmm | Slot | Port | Dest Nmm | |
|---|---|---|---|---|
| N0 | 4 | 1 | N1 | ←561 |
| N2 | 2 | 2 | N3 | ←562 |
| N4 | 2 | 2 | N5 | ←563 |

560 points to the Dest Nmm header.

Back Links

| Source Nmm | Slot | Port | Dest Nmm | |
|---|---|---|---|---|
| N1 | 1 | 1 | N0 | ←571 |
| N3 | 3 | 1 | N2 | ←572 |
| N5 | 2 | 1 | N4 | ←573 |

570 points to the Dest Nmm header.

Link Table

Link Entry for N0     600

| Dest Nmm | Slot | Port |     |
|----------|------|------|-----|
| N0       | 0    | 0    | ←601 |
| N2       | 2    | 1    | ←602 |
| N4       | 2    | 1    | ←603 |

Link Entry for N1     610

| Dest Nmm | Slot | Port |     |
|----------|------|------|-----|
| N1       | 0    | 0    | ←611 |
| N0       | 1    | 1    | ←612 |
| N2       | 1    | 1    | ←613 |
| N4       | 1    | 1    | ←614 |

Link Entry for N2     620

| Dest Nmm | Slot | Port |     |
|----------|------|------|-----|
| N2       | 0    | 0    | ←621 |
| N0       | 3    | 4    | ←622 |
| N4       | 3    | 1    | ←623 |

Link Entry for N3     630

| Dest Nmm | Slot | Port |     |
|----------|------|------|-----|
| N3       | 0    | 0    | ←631 |
| N0       | 3    | 1    | ←632 |
| N2       | 3    | 1    | ←633 |
| N4       | 3    | 1    | ←634 |

Link Table

Fig. 6b

Link Entry for N4       640

| Dest Nmm | Slot | Port |
|---|---|---|
| N4 | 0 | 0 | ←641
| N0 | 2 | 1 | ←642
| N2 | 2 | 1 | ←643

Link Entry for N5       650

| Dest Nmm | Slot | Port |
|---|---|---|
| N5 | 0 | 0 | ←651
| N0 | 2 | 1 | ←652
| N2 | 2 | 1 | ←653
| N4 | 2 | 1 | ←654

Resolved Links

Fig. 6c

| Source Nmm | Slot | Port | Dest Nmm | |
|---|---|---|---|---|
| N0 | 4 | 1 | N1 | ←661 |
| N2 | 2 | 2 | N3 | ←662 |
| N4 | 2 | 2 | N5 | ←663 |

660

Back Links

| Source Nmm | Slot | Port | Dest Nmm | |
|---|---|---|---|---|
| N1 | 1 | 1 | N0 | ←671 |
| N3 | 3 | 1 | N2 | ←672 |
| N5 | 2 | 1 | N4 | ←673 |

670

Link Table                                    Fig. 7a

Link Entry for N0        700

| Dest Nmm | Slot | Port |
|----------|------|------|
| N0       | 0    | 0    | ←701
| N2       | 2    | 1    | ←702
| N4       | 2    | 1    | ←703

Link Entry for N1        710

| Dest Nmm | Slot | Port |
|----------|------|------|
| N1       | 0    | 0    | ←711
| N0       | 1    | 1    | ←712
| N2       | 1    | 1    | ←713
| N4       | 1    | 1    | ←714

Link Entry for N2        720

| Dest Nmm | Slot | Port |
|----------|------|------|
| N2       | 0    | 0    | ←721
|          | 3    | 4    | ←722
|          | 3    | 1    | ←723

Link Table

Fig. 7b

Link Entry for N3  730

| Dest Nmm | Slot | Port |
|---|---|---|
| N3 | 0 | 0 | ←731
| N0 | 3 | 1 | ←732
| N2 | 3 | 1 | ←733
| N4 | 3 | 1 | ←734

Link Entry for N4  740

| Dest Nmm | Slot | Port |
|---|---|---|
| N4 | 0 | 0 | ←741
| N0 | 2 | 1 | ←742
| N2 | 2 | 1 | ←743

Link Entry for N5  750

| Dest Nmm | Slot | Port |
|---|---|---|
| N5 | 0 | 0 | ←751
| N0 | 2 | 1 | ←752
| N2 | 2 | 1 | ←753
| N4 | 2 | 1 | ←754

Resolved Links

| Source Nmm | Slot | Port | Dest Nmm | |
|---|---|---|---|---|
| N0 | 4 | 1 | N1 | ←761 |
| N2 | 2 | 2 | N3 | ←762 |
| N4 | 2 | 2 | N5 | ←763 |
| N2 | 3 | 4 | N0 | ←764 |
| N2 | 3 | 1 | N4 | ←765 |

Back Links

770

| Source Nmm | Slot | Port | Dest Nmm | |
|---|---|---|---|---|
| N1 | 1 | 1 | N0 | ←771 |
| N3 | 3 | 1 | N2 | ←772 |
| N5 | 2 | 1 | N4 | ←773 |
| N0 | 2 | 1 | N2 | ←774 |
| N4 | 2 | 1 | N2 | ←775 |

Link Table

Fig. 8a

Link Entry for N0     800
↓

| Dest Nmm | Slot | Port |
|---|---|---|
| N0 | 0 | 0 | ←801
| N2 | 2 | 1 | ←802

Link Entry for N1     810
↓

| Dest Nmm | Slot | Port |
|---|---|---|
| N1 | 0 | 0 | ←811
| N2 | 1 | 1 | ←812

Link Entry for N2     820
↓

| Dest Nmm | Slot | Port |
|---|---|---|
| N2 | 0 | 0 | ←821

Resolved Links

Fig. 8b

Link Entry for N3    830

| Dest Nmm | Slot | Port |
|----------|------|------|
| N3       | 0    | 0    | ←831
| N2       | 3    | 1    | ←832

Link Entry for N4    840

| Dest Nmm | Slot | Port |
|----------|------|------|
| N4       | 0    | 0    | ←841
| N2       | 2    | 1    | ←842

Link Entry for N5    850

| Dest Nmm | Slot | Port |
|----------|------|------|
| N5       | 0    | 0    | ←851
| N2       | 2    | 1    | ←852

Resolved Links

Fig. 8c

| Source Nmm | Slot | Port | Dest Nmm |   |
|---|---|---|---|---|
| N0 | 4 | 1 | N1 | ←861 |
| N2 | 2 | 2 | N3 | ←862 |
| N4 | 2 | 2 | N5 | ←863 |
| N2 | 3 | 4 | N0 | ←864 |
| N2 | 3 | 1 | N4 | ←865 |

↑ 860

Back Links

| Source Nmm | Slot | Port | Dest Nmm |   |
|---|---|---|---|---|
| N1 | 1 | 1 | N0 | ←871 |
| N3 | 3 | 1 | N2 | ←872 |
| N5 | 2 | 1 | N4 | ←873 |
| N0 | 2 | 1 | N2 | ←874 |
| N4 | 2 | 1 | N2 | ←875 |

↑ 870

Link Table

Link Entry for N0      900

| Dest Nmm | Slot | Port |
|---|---|---|
| N0 | 0 | 0 |

←901

Link Entry for N1      910

| Dest Nmm | Slot | Port |
|---|---|---|
| N1 | 0 | 0 |

←911

Link Entry for N2      920

| Dest Nmm | Slot | Port |
|---|---|---|
| N2 | 0 | 06 |

←921

Link Table                                              Fig. 9b

Link Entry for N3                    930
                                      ↓

| Dest Nmm | Slot | Port |
|----------|------|------|
| N3       | 0    | 0    | ←931

Link Entry for N4                    940
                                      ↓

| Dest Nmm | Slot | Port |
|----------|------|------|
| N4       | 0    | 0    | ←941

Link Entry for N5                    950
                                      ↓

| Dest Nmm | Slot | Port |
|----------|------|------|
| N5       | 0    | 06   | ←951

Fig. 9c

Resolved Links

960

| Source Nmm | Slot | Port | Dest Nmm |   |
|---|---|---|---|---|
| N0 | 4 | 1 | N1 | ←961 |
| N2 | 2 | 2 | N3 | ←962 |
| N4 | 2 | 2 | N5 | ←963 |
| N2 | 3 | 4 | N0 | ←964 |
| N2 | 3 | 1 | N4 | ←965 |

Back Links

970

| Source Nmm | Slot | Port | Dest Nmm |   |
|---|---|---|---|---|
| N1 | 1 | 1 | N0 | ←971 |
| N3 | 3 | 1 | N2 | ←972 |
| N5 | 2 | 1 | N4 | ←973 |
| N0 | 2 | 1 | N2 | ←974 |
| N4 | 2 | 1 | N2 | ←975 |

Link Entry for N1     1020

| Dest Nmm | Slot | Port |
|---|---|---|
| N1 | 0 | 0 | ← 1021
| N2 | 1 | 2 | ← 1022
| N3 | 1 | 2 | ← 1023
| N5 | 2 | 3 | ← 1024
| N6 | 2 | 3 | ← 1025

Link Entry for N2     1030

| Dest Nmm | Slot | Port |
|---|---|---|
| N2 | 0 | 0 | ← 1031
| N1 | 4 | 6 | ← 1032
| N3 | 4 | 6 | ← 1033

Link Entry for N3     1040

| Dest Nmm | Slot | Port |
|---|---|---|
| N3 | 0 | 0 | ← 1041
| N1 | 3 | 1 | ← 1042
| N2 | 3 | 1 | ← 1043

Link Entry for N5     1050

| Dest Nmm | Slot | Port |
|---|---|---|
| N5 | 0 | 0 | ← 1051
| N1 | 2 | 4 | ← 1052
| N6 | 2 | 4 | ← 1053

Link Entry for N6     1060

| Dest Nmm | Slot | Port |
|---|---|---|
| N6 | 0 | 0 | ← 1061
| N1 | 6 | 5 | ← 1062
| N5 | 6 | 5 | ← 1063

Fig. 10b

Link Entry for N1    1200

| Dest Nmm | Slot | Port | |
|---|---|---|---|
| N1 | 0 | 0 | ←1201 |
| B1 | 1 | 2 | ←1202 |
| B2 | 2 | 3 | ←1203 |

Link Entry for N2    1210

| Dest Nmm | Slot | Port | |
|---|---|---|---|
| N2 | 0 | 0 | ←1211 |
| B1 | 4 | 6 | ←1212 |

Link Entry for N3    1220

| Dest Nmm | Slot | Port | |
|---|---|---|---|
| N3 | 0 | 0 | ←1221 |
| B1 | 3 | 1 | ←1222 |

Link Entry for N5    1230

| Dest Nmm | Slot | Port | |
|---|---|---|---|
| N5 | 0 | 0 | ←1231 |
| B2 | 2 | 4 | ←1232 |

Link Entry for N6    1240

| Dest Nmm | Slot | Port | |
|---|---|---|---|
| N6 | 0 | 0 | ←1241 |
| B2 | 6 | 5 | ←1242 |

Link Entry for B1    1250

| Dest Nmm | Slot | Port |
|---|---|---|
| B1 | 0 | 0 | ←1251
| N2 | 99 | 99 | ←1252
| N1 | 99 | 99 | ←1253
| N3 | 99 | 99 | ←1254

Link Entry for B2    1260

| Dest Nmm | Slot | Port |
|---|---|---|
| B2 | 0 | 0 | ←1261
| N1 | 99 | 99 | ←1262
| N5 | 99 | 99 | ←1263
| N6 | 99 | 99 | ←1264

NETWORK TOPOLOGY DETERMINATION BY DISSECTING UNITARY CONNECTIONS AND DETECTING NON-RESPONSIVE NODES

This is a continuation of application Ser. No. 08/235,661, filed Apr. 29, 1994, now abandoned.

BACKGROUND OF THE INVENTION

1. Field of the Invention

The present invention relates to determining topology in a networking system. More specifically, the present invention relates to receiving information from hubs or "concentrators" in a networking system regarding other hubs to which they are connected, in order to determine the topology of the network.

2. Background Information

Topology information is an integral part of maintaining and diagnosing faults in networking systems. Typically, from a central console, a network manager console or other device coupled to a networking system, at periodic intervals, requests information regarding the connectivity of nodes in the network. Bridges, concentrators, routers, etc. can respond, in certain prior art implementations, to these requests providing such information as the number of nodes or hubs to which it is connected, the location of the nodes and other information. From this information topology information can be obtained which indicates the current operating state of the network. Thus, if links become unstable or fail, this information may be determined and corrective measures may be taken, such as correcting physical defects in the networking system and/or other corrective action.

Prior art methods of determining topology in a networking system require that nodes at each level in the networking hierarchy provide the capability to return information about what other nodes they may communicate with. These include, in systems which include hubs and/or concentrators as are known in the prior art. Prior art methods of determining topology, however, require that all hubs or concentrators be of a known or predetermined type and thus enabling communication between other hubs and/or concentrators in the system. Thus, when requests for topology information from each of the hubs is made, specific predetermined information in a known format is returned to the requesting node, typically a management console or other central management node. Prior art methods of determining topology, however, cannot determine topology in a network in which unknown devices are used, these are not capable of responding in a predetermined manner. Thus, if a system includes nodes of an unknown type, the topology of the system will not be able to be determined.

Another shortcoming of prior art techniques is that no one hub or concentrator in a networking system is able to determine the entire topology of the system. Each concentrator or hub in a networking system is only able to determine which other hubs and or nodes to which it is coupled, and the ports and/or slots through which that communication is provided. Prior art techniques do not enable the determination of topology in the networking system as a whole having only this type of information available. Thus, prior art techniques for determining topology in a system including hubs or other types of nodes suffer from several shortcomings.

SUMMARY AND OBJECTS OF THE PRESENT INVENTION

One of the objects of the present invention is to allow topology information to be determined in a networking system via communication with network management modules.

Another of the objects of the present invention is to determine topology information by requesting that each hub in a networking system provide information about other hubs to which it is connected.

Another of the objects of the present invention is to provide a system for determining topology in a networking system wherein connection information is received from a plurality of network management modules in the system, and topology information is extracted from that information.

Another of the objects of the present invention is to provide a method for determining topology in a networking system wherein certain nodes in the network may be of an undetermined type.

Another of the objects of the present invention is to allow topology information to be determined in the networking system without requiring responses from certain nodes in the system.

These and other objects of the present invention are provided for by a computer-implemented method and apparatus for determining a topology of a network from all central management node. Signals are received from a source hubs in the network, wherein each of the signals contains connection information for the source hubs including destination hubs to which the source hubs are coupled, and a corresponding connection port on the source hubs through which the destination hubs are coupled. The connection information is processed by locating all unitary connections in the connection information and iteratively performing certain steps until there are no more unitary connections in the connection information. These steps include determining return connection information in the connection information which has the destination hub as a source hub, and the source hub as a destination hub; storing the unitary connection and the return connection information in a resolved connection information area; and then removing the unitary connection and the return connection information from the return connection information. Connection information for each of the return connection information in the resolved connection information area is removed for each entry in the original connection information which has the connection port matching the port for the return information. If the connection information is not empty and there are additional unitary connections in the connection information, then the foregoing steps are repeated until there are nor more unitary connections or the processed connection information is empty. The resolved connection information is then stored for a complete topology.

The above topology method and apparatus is also useful in circumstances where certain source hubs are non-responsive to requests for connection information, that is, they are either malfunctioning, or are hubs of an unknown or unsupported type, or are non-managed. In this circumstance, the connection information may be further processed to determine such non-responsive hubs. This method and an apparatus for performing the method may be implemented either in the presence or absence of the above-technique, but certain hubs respond with connection information indicating other hubs to which they are coupled through corresponding connection ports including non-responsive hubs in the network. After the receipt of this information, it is determined if connection information for each source hub comprises a plurality of destination hubs for one connection port on the source hub. If not, the process terminates (e.g. there are no non-responsive hubs). Otherwise, for each of the plurality of destination hubs coupled to the one connection port, it is determined whether the connection information includes return connection information from the each destination hub to the source hub. If not, the connection information for the one connection port from the connection information is removed and the process terminates. New connection information is created by linking the source hub to an unsupported hub, linking the unsupported hub to the each destination hub, and linking the destination hub to the unsupported hub in the connection information. Finally, the connection information from the source hub to the destination hub, and the connection information from the destination hub to the source hub is removed to remove the plurality of entries linked to the single connection port of the single source.

Other objects, features and advantages of the present invention will be apparent from the accompanying description and figures which follow below.

BRIEF DESCRIPTION OF THE DRAWINGS

The present invention is illustrated by way of example and not limitation in the figures of the accompanying drawings in which like references indicate like elements and in which:

FIGS. 4a–8c illustrate link entries for initial network management modules, and iterations of the process shown in FIG. 3b for determining a network's topology according to an embodiment of the invention.

FIGS. 9a–9c illustrates several link entry tables for a topology which includes "black boxes" or nodes of an unknown type which shall be referenced to describe an embodiment of the present invention.

FIGS. 10a and 10b illustrate an example topology of a network which shall be referenced to describe an embodiment of the present invention, the network including network management modules and nodes of an unknown type and link table entries representing that topology.

FIGS. 12a and 12b show the transformed link entries for the network management modules including references to the unknown nodes in the topology, where the link entries have been transformed according to an embodiment of the present invention.

DETAILED DESCRIPTION

Implemented embodiments of the present invention include methods and apparatus for determining network topology, including, in circumstances where certain devices in the network cannot or do not respond with connection information. That is, certain devices do not support the protocols which will be described here. For the remainder of this application, as will be discussed, reference will be made to "concentrators" or "hubs" which have a plurality of plug-in modules which each have ports for connecting to different types of network cables such as fiber optic cable, unshielded twisted pair cable and shielded twisted pair cable. Reference is specifically made to U.S. Pat. No. 5,226,120 of Brown et al., (hereinafter "Brown") issued on Jul. 6, 1993, which shows in detail the hardware structure and certain software techniques for implementing these concentrators and/or hubs. To the extent required for an understanding of the present invention, this patent is hereby incorporated by reference. It can be appreciated by one skilled in the art, that although the techniques to be described here are implemented in a software implementation in a central processing unit contained in a single one of the hubs or concentrators in the networking system, preferably at the top level of the networking system (e.g., the network concentrator 22a shown in FIG. 1 and shown in detail in FIG. 19 of U.S. Pat. No. 5,226,120), it can be appreciated by one skilled in the art that this apparatus may be implemented at any level in a networking architecture for determining the topology of the network by a specific concentrator. Moreover, it can be appreciated by one skilled in the art that various departures and other modifications of the techniques to be described here may be made by one skilled in the art without departing from the overall spirit and scope of the present invention. Thus, the methods and apparatus to be described here are intended to be viewed in an illustrative manner only and not to be viewed as limiting the present invention. Further, although the present invention will primarily be directed towards a method which is implemented in a software code implementation in concentrator 22a or any of the other concentrators shown in Brown, it can be appreciated by one skilled in the art that these may be implemented in any variety of dedicated hardware devices within one concentrator 22a including, but not limited to, discrete logic circuits, large scale integrated circuits (VLSI's) or application-specific integrated circuits (ASIC's).

Figure 1A:
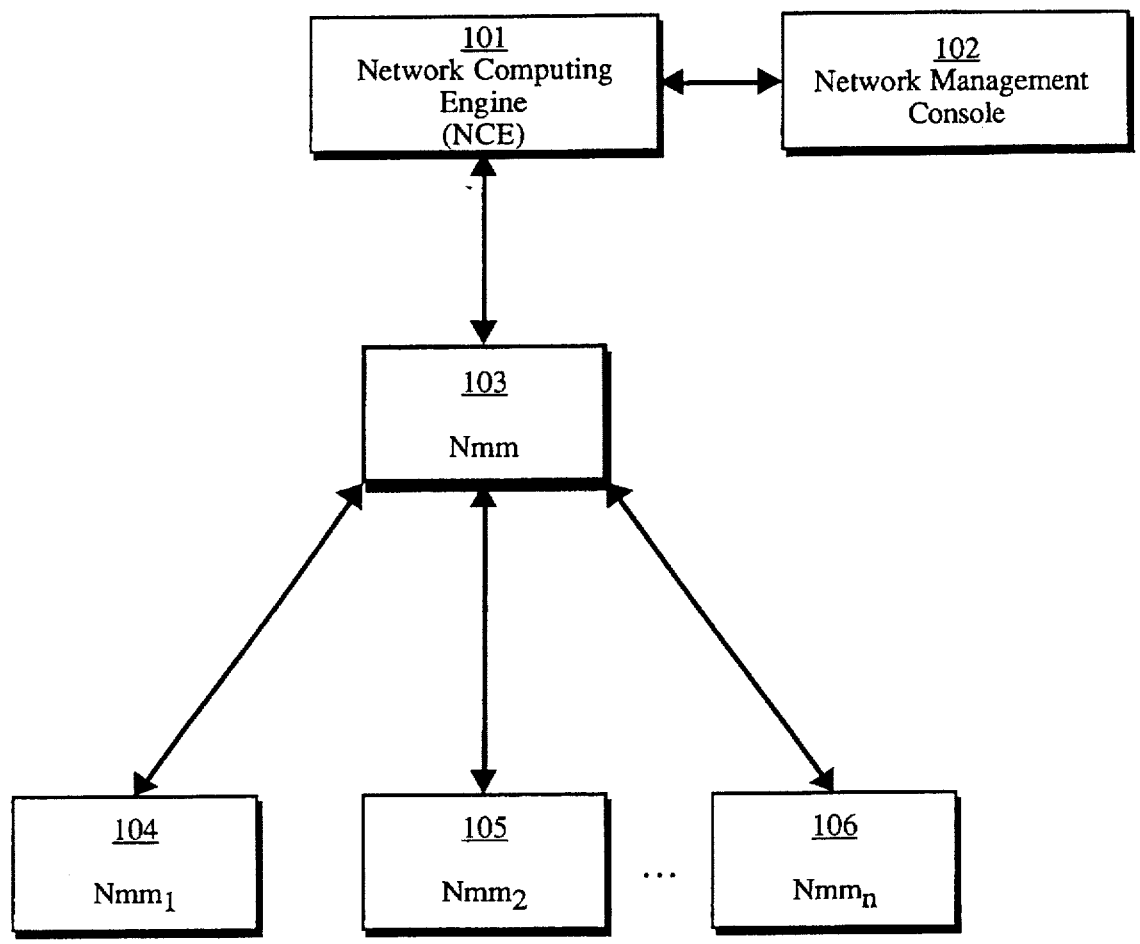
FIG. 1a shows a block diagram of a networking system in which one embodiment of the present invention may be implemented.

An example of a configuration of a system implementing the methods and apparatus of the preferred embodiment is illustrated as system 100 in FIG. 1a. The methods and apparatus to be described here will be implemented in network computing engine (NCE) 101 which is coupled to the backplane of network management module 103 shown in FIG. 1a. Network computing engine 101 further may be coupled to a network management console 102 for communicating various control information to a system manager or other user of network management console 102. As is illustrated, Nmm's or concentrators as is described in Brown may be hierarchically linked in a variety of configurations, such as that shown in system 100 of FIG. 1a. A more detailed description of network computing engine 101 will be described with reference to FIG. 1b.

Figure 1B:
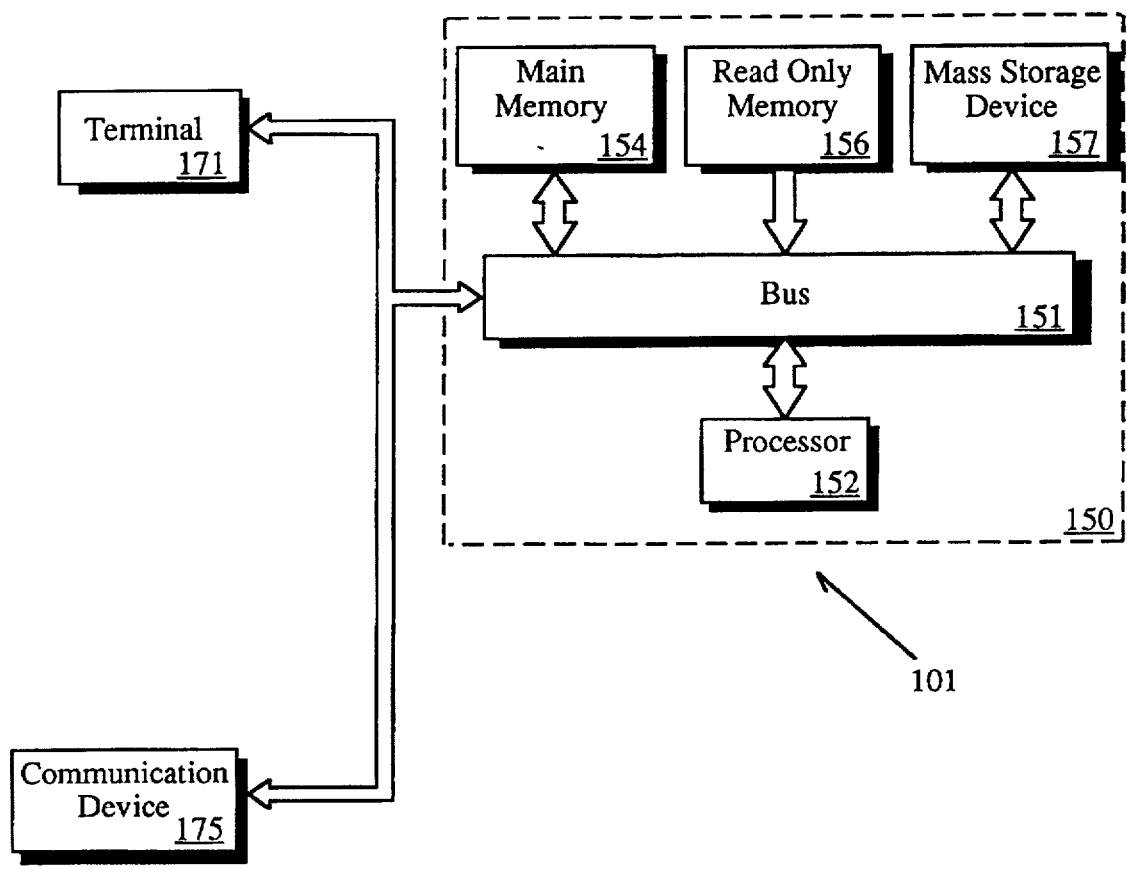
FIG. 1b shows a block diagram of a Network Computing Engine (NCE) according to an embodiment of the invention.

Referring to FIG. 1b, a system upon which one embodiment of a network computing engine (NCE—e.g., 101 of FIG. 1b) of the present invention as implemented is shown. 101 comprises a bus or other communication means 151 for communicating information, and a processing means 152 coupled with bus 151 for processing information. System 150 further comprises a random access memory (RAM) or other volatile storage device 154 (referred to as main memory), coupled to bus 151 for storing information and instructions to be executed by processor 152. Main memory 154 also may be used for storing temporary variables or other intermediate information during execution of instructions by processor 152. NCE 101 also comprises a read only memory (ROM) and/or other static storage device 156 coupled to bus 151 for storing static information and instructions for processor 152, and a data storage device 157 such as a magnetic disk or optical disk and its corresponding disk drive. Data storage device 157 is coupled to bus 151 for storing information and instructions. System 101 may further be coupled to a console 171, such as a cathode ray tube (CRT) or liquid crystal display (LCD) or teletype coupled to bus 151 for displaying information to a computer user. In the implemented embodiments, another device which is coupled to bus 151 is a communication device 175 which is a means for communicating with other devices (e.g., Nmm's or a network management console—e.g., 102 of FIG. 1b. This communication device includes communicating with other nodes in the network. In implemented embodiments, this includes an Ethernet standard interface coupled to a CSMA/CD backplane for communicating network information with the Nmm 103 and other Nmm's in the system 100. Note, also, that any or all of the components of NCE 101 and associated hardware may be used in various embodiments, however, it can be appreciated that any configuration of the system that includes a processor 152 and a communication device 175 may be used for various purposes according to the particular implementation.

In one embodiment, NCE 101 is a workstation, such as the Sun SparcStation available from Sun Microsystems of Mountain View, Calif. Processor 152 may be one of the Spare family of microprocessors, manufactured by Sun Microsystems.

Figure 2:
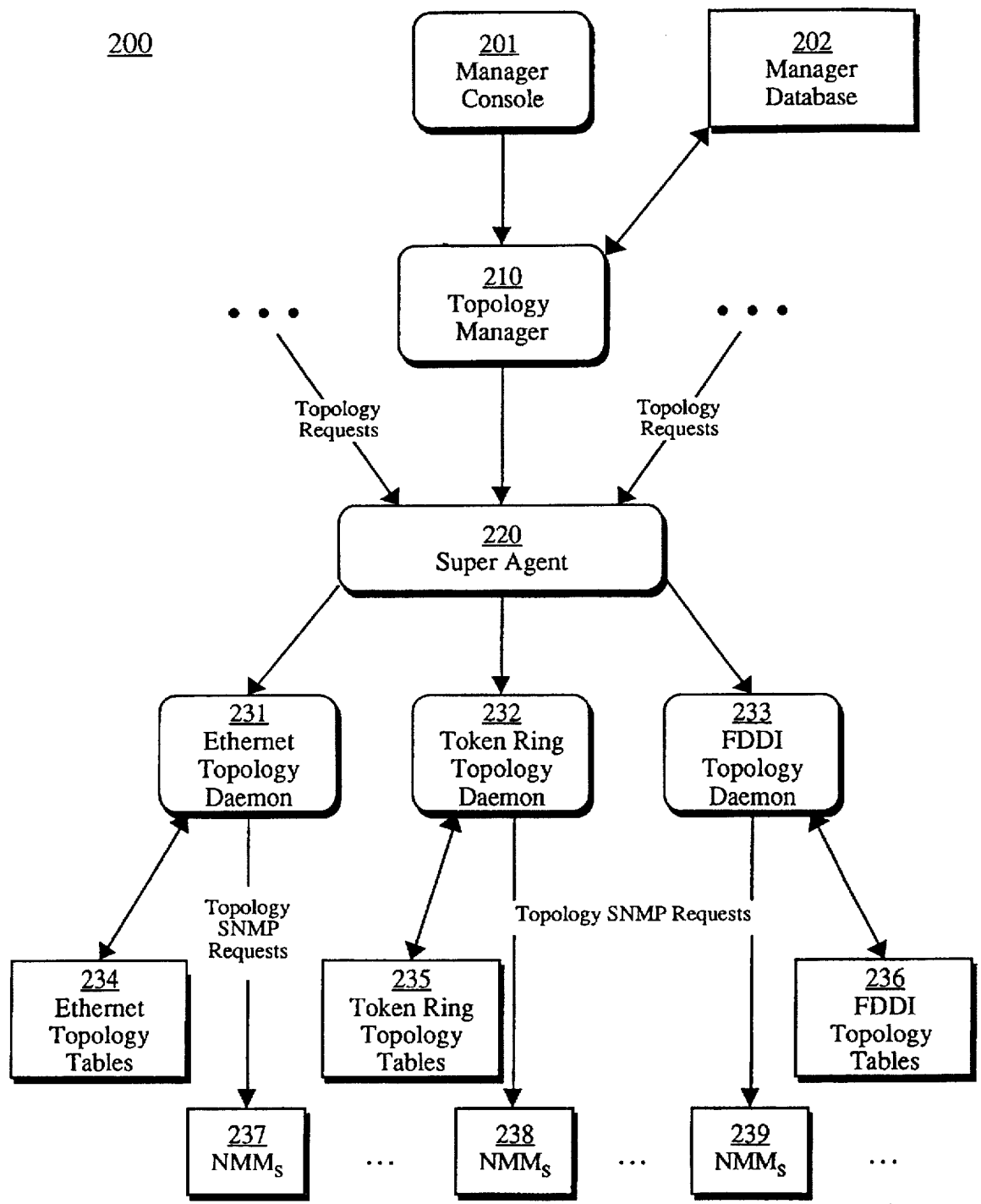
FIG. 2 shows the software architecture of processes contained within a networking system for determining topology according to an embodiment of the invention.

200 shown in FIG. 2 is a software architecture of the processes which are operative within a network implementing the embodiments of the present invention. 200 includes a manager console 201 and a manager database 202 which are used for maintaining the current state of the network which are operative within a network management console 102. These provide communication with a topology manager 210 which maintains the current topology of the system via requests from the manager console 201 and via references to the manager database 202. Topology manager 210 in network management console 102 further communicates with a super agent process 220 operative within NCE 101 which provides all communication with the various network management modules (Nmm's) (e.g., 103–106 of FIG. 1a) coupled to the concentrator. The super agent process 220 in NCE 101 can communicate with three other processes 231–233 for communicating with each of the different types of networks supported by the concentrator. In implemented embodiments of the present invention, these include an Ethernet type topology daemon process 231, a token ring type topology daemon process 232 and a fiber-distributed data interface (FDDI) type topology daemon process 233. Each of the separate processes may maintain topologies about their respective media via topology requests to Nmm's (Network Management Modules or other concentrators) 237–239 coupled to the concentrator developing the topology. Moreover, each of these daemons can maintain current topology information regarding the Nmm's to which these processes communicate in topology tables 234–236 in NCE 101. Communication is provided between NCE 101 with the Nmm's 237–239 via topology SNMP (Simple Network Management Protocol) requests over the internal bus of the concentrator. The super agent 220 can further request topology information from each of the topology processes 231–233 wherein the requests for topology information may be transmitted to the topology manager 210 or other processes which can communicate with super agent 220.

Figure 3A:
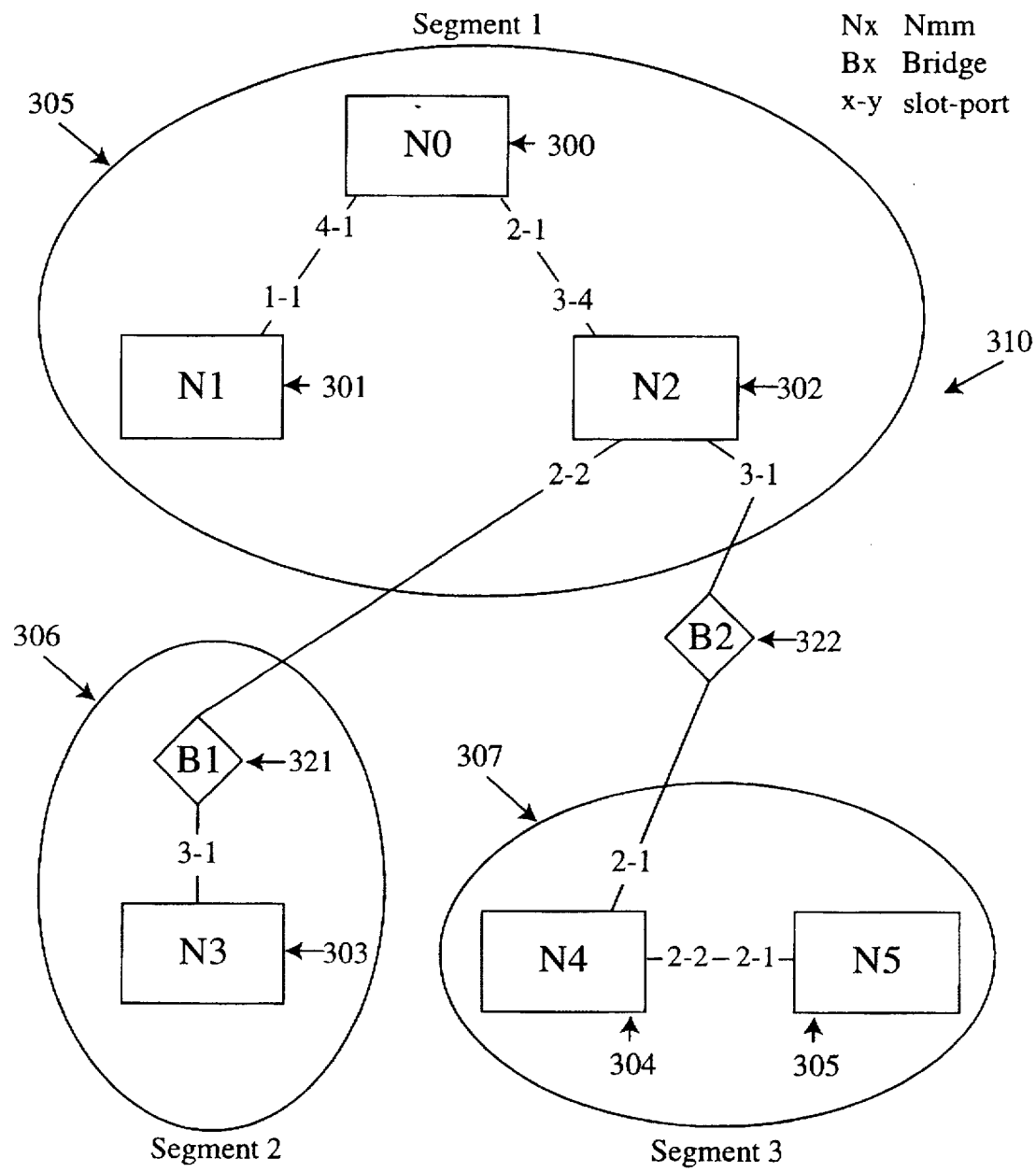
FIG. 3a illustrates an example topology which may be present in a networking system which shall be referenced to describe an embodiment of the present invention.

An example topology which may be determined using implemented embodiments of the present invention is illustrated as 310 in FIG. 3a. 310 comprises a first segment 305 which includes the network management modules 300, 301 and 302. Note that in the first segment and the remaining portions of the figure that any given topology using the embodiments of the present invention, that only unitary links are provided from network management module to network management module. That is, there cannot be a plurality of links between two given network management modules giving two paths of communication from one source Nmm to one destination Nmm. In the first segment 305, Nmm N0 300 is coupled via its slot 4 port 1 to network management module N1 301. Network management module N0 300 is further coupled via slot 2 port 1 to network management module N2 302. In turn, network management module N2 302 is coupled via bridges 321 and 322 to network management modules N3 303 and N4 304. Nmm N3 303 is in segment 306, and Nmm N2 302 is coupled via slot 2, port 2, in Nmm N2 302 to Nmm N3 303. Communication is provided from 303 to 302 via slot 3, port 1. In addition, Nmm N2 302 is coupled to network management module N4 304 via its slot 3, port 1. Further, Nmm N4 304 is coupled via its slot 2, port 1. Finally, in segment 307, Nmm N4 304 is coupled via slot 2, port 2 to Nmm N5 305. Nmm N5 305 communicates with N4 304 via its slot 2, port 1. This example topology will be used for the remainder of this application in describing one embodiment of the present invention.

Figure 3B:
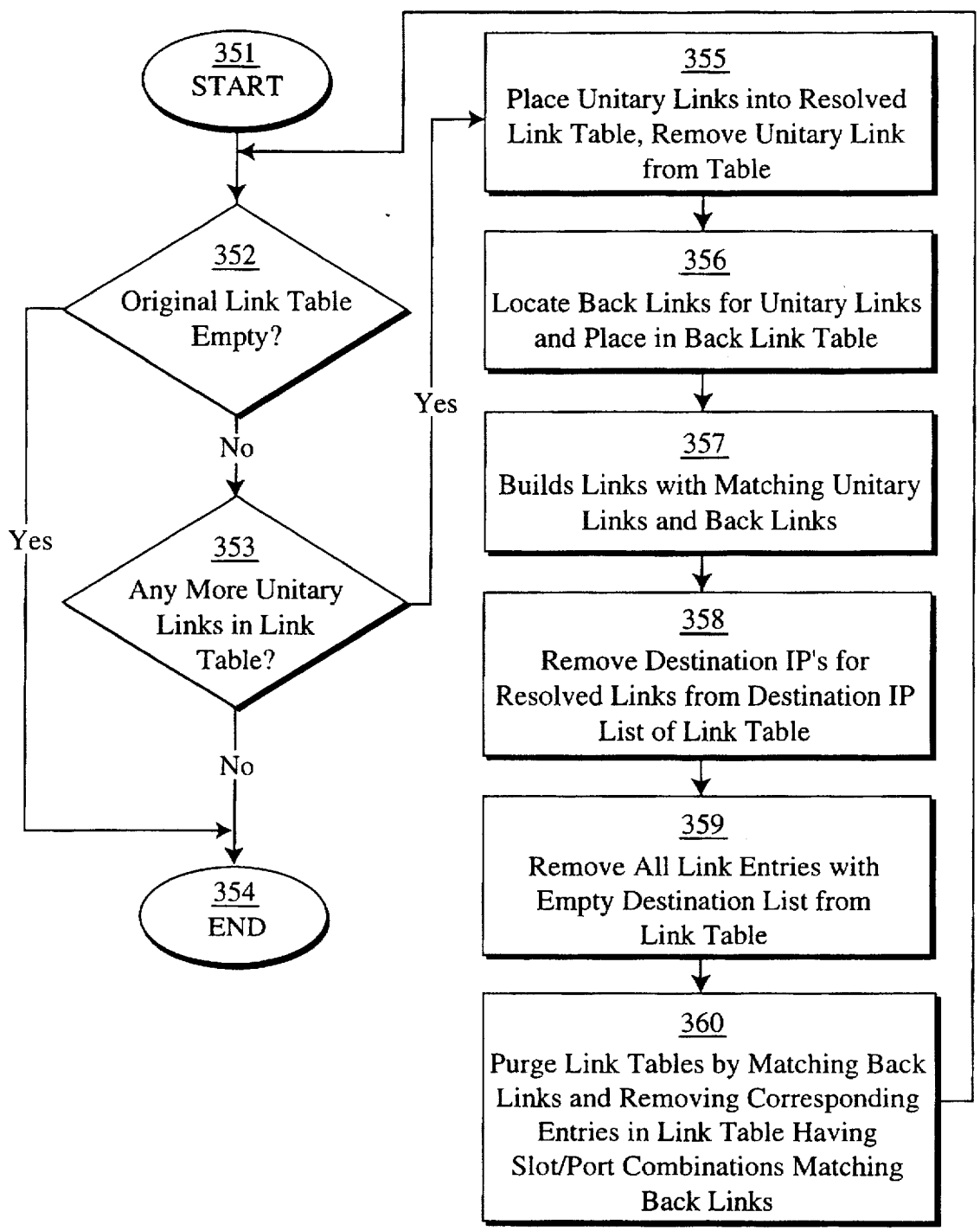
FIG. 3b shows a process performed by an NCE for determining topology in the networking system according to an embodiment of the invention.
Figure 4B:
Figure 4B:

The process for topology determination which may be executed within ethernet topology daemon 231 of FIG. 2 is illustrated as process 350 in FIG. 3b. Process 350 commences at a typical process entry point 351. Prior to entry into process 350, however, through the method covered in Brown, each of the Nmm's in the network has determined which other network management modules are in its network and via which slot and which port it has noted each Nmm. Thus, although the precise topology of the system is not known, each network management module does know with which network management modules it can communicate via requests over each slot/port to which the Nmm's can communicate and respond to requests received from other Nmm's over the same slot/port. Upon SNMP requests from network managers at higher levels in the topology, Nmm's provide this information to the requesting network managers through the requested slot/port. This may include a manager console or other device residing at the highest level or intermediate levels in the topology. At any rate, upon entry into the process, a series of link entries, illustrated as 400–450 in FIGS. 4a and 4b, is present in the memory space in the ethernet topology daemon of NCE 101 upon entry into the topology determination process 350. Note also that in each of the tables 400–450 the initial entries (e.g., 401, 411, 421, 431, 441 or 451) each indicates a label for the particular Nmm. This is indicated by the slot and port field containing a zero, for example, in the instances of entry 400 of FIG. 4a. As is clearly shown by reviewing sub-entries 401 then 406 of entry 400, 400 shows the links for Nmm N0 (shown as 300 in FIG. 3a).

Upon entry into process 350 of FIG. 3b, at step 351 it is determined at step 352 whether the original link table is empty, then at step 353 whether there are any more unitary links in the original link tables. A unitary link is defined as a single destination Nmm (referred to as $Nmm_d$) coupled to a single slot/port combination of a specific source $Nmm_s$. As is evident from viewing the tables in FIGS. 4a and 4b, there are several of these. For example, one such unitary link includes the link from Nmm N0 to Nmm N1 as illustrated by sub-entry 406 of entry 400. For all unitary links in the link entries of the table, steps 355–360 are performed. For example, as viewed with reference to table 400, the unitary link 406 at step 355 is placed into a new entry in a table known as the resolved link table. This is to allow the topology manager to determine the exact connection between Nmm's N0 and N1. This unitary link 406 is then removed from the group of link entries in 400, as illustrated in 500 of FIG. 5a. Once this has been performed at step 355, then, at step 356 it is determined by viewing the entry for network management module N1 in table 410 the back link of return communication path from N1 to N0. This entry (e.g., sub-entry 412 of table 410 in FIG. 4a) is then placed in to a "back link" table. At step 357, the unitary link and its matching back link are consolidated into a link structure which will be inserted into the database tables of 234 in FIG. 2.

FIGS. 5a and 5b show the original link entries with each of the unitary link entries removed. The link entries are now referred to as 500–550. Moreover, FIG. 5c shows the "resolved link" table 560, and also the back link table 570. Note that 500–550 are essentially the same as tables 400–450, however, with the IP addresses for the unitary entries 406, 424 and 446 deleted. Because these are unitary links, they are now indicated as "resolved links" and have been placed into the resolved link table 560 as entries 561, 562 and 563. Moreover, back links for each of the unitary connections which were in the original entries 412, 434 and 456 of the link entries group in 410, 430 and 450, respectively, have been copied as entries 571, 572 and 573 in the back links table 570.

Then at step 358 the destination IP (internet protocol) address for the destination Nmm in the unitary links are removed from the destination Nmm list of the link entries in the original link table, if the destination IP is not also the source IP. Thus, for the unitary link 406 in table 400, for example, the address N1 will be removed from all the link entries groups 410–450. So, in FIGS. 4a and 4b, entry 423 is removed from 420, entry 433 is removed from 430, entry 443 is removed from 440 and entry 453 is removed form 450. Entry 411, however, is not removed from 410 because the source IP is the same as the destination IP.

Figure 6A:
Figure 6A:
Figure 6A:
Figure 6A:

FIGS. 6a and 6b show the original link entries after step 358 is performed. Each of the unitary link entries is removed, as in FIGS. 5a and 5b, and all entries whose destination IP address matches the destination IP address of the unitary link entries are removed. The new link groups are now called 600–650. As can be observed, FIG. 6c contains the resolved links and back links and these have not changed from those previously illustrated in FIG. 5c. Process 300 then proceeds to step 359.

Then at step 359, all entries which now contain no destination address entries as a result of step 358 will be removed from the original link table. The first iteration of steps 355–358, however, did not create any such link groups. Thus, process 350 proceeds to step 360.

At step 360, the original link groups table is purged in the following way. For each back link entry in the back link table 670 in FIG. 6c, if there is any link entry from 600–650 which has exactly one destination address in the destination Nmm list, check if the source IP, the slot and port match those in the back link entry. If a match is found, remove the link entry form 600–650. The first iteration of steps 355–360, however, did not leave any such link groups.

Thus completes the first iteration of steps 355–360 in the algorithm. At this point, the algorithm goes back to step 352 to check if the original link groups table is empty and, thus, a complete topology has been determined or, whether additional unitary links are present in the table. If the tables are now empty as detected at step 352, then the process is thus complete at step 354. If the original link groups table is not empty but there are no more unitary links left at step 353, then the process is complete and will proceed to step 354. If there are additional unitary links, then steps 355 through 360 must be repeated in order to reduce the table to its minimum.

Now, after the first iteration, the original link table is not empty as detected at step 352, then process 350 proceeds to step 353 to determine whether there are any more unitary links in the tables. Now, the table has been reduced to those entries shown in FIGS. 6a and 6b. As is apparent, by the entries 622 and 623 contained within link group 620, two remaining unitary link elements remain in the link group 620. Thus, step 353 yields a positive result, and process 350 must repeat steps 355–360 iteratively again. Then, the link entries 600–650 are processed yet again in the manner described above, reducing the link table after the completion of iteration of steps 355–360.

Upon completion of steps 355–360, the unitary links 622 and 623 in FIG. 6a are identified and are removed as 722 and 723 from the link entry 720 in FIG. 7a, yielding the tables 700–750 in FIGS. 7a and 7b. The resolved links table 760 and the back link entries in table 770 in FIG. 7c are produced. The tables are similar to 660 and 670 in FIG. 6c, except that the entries 764 and 765 in the resolved links table 760, and the entries 774 and 775 in the back links table 770 are added upon the second iteration of steps 355–360.

At step 358, the destination addresses for the new resolved links 764 and 765 are removed from the link table entries 700–750, resulting in the link entries 800–850 in FIGS. 8a and 8b. The resolved links in table 860 and the back links in table 870 are the same as in 760 and 770. The process moves on to step 359.

Then at step 359, all entries 800–850 which now contain no destination address entries as a result of step 358 will be removed from the link table. The second iteration of steps 355–358, however, did not create any such links. Thus, process 350 proceeds to step 360.

Figure 9A:
Figure 9A:
Figure 9A:

At step 360, the link entries 800–850 in FIGS. 8a and 8b are purged in the following way. For each back link entry in the back link table 870 in FIG. 8c, if there is any link entry from 800–850 which has exactly one destination address in the destination Nmm list, check if the source IP, the slot and port match those in the back link entry. If a match is found remove the link entry from 800–850. The matches found are 871 in table 870 matches link entry 812, 872 in table 870 matches link entry 832, 873 in table 870 matches link entry 852, 874 in table 870 matches link entry 802, 875 in table 870 matches link entry 842. Thus, the link entries 802, 812, 832, 842 and 852 are removed from 800–850 as a result of step 360. The resulting link entries are shown in FIGS. 9a and 9b as 900–950.

Thus, the second iteration of the algorithm has been completed. The process 350 then proceeds to step 352. The link table with entries 900–950 is now empty and at step 352, a test yields a positive result, and the process terminates at step 354 of FIG. 3b. The resolved links table 960 and the back links table 970 now completely describe the topology of the network originally illustrated as 310 of FIG. 3a alone.

A complete topology has thus been determined for the network, using only the slot/port connection information and each of the connectivity information received from each of the Nmm's coupled to the concentrator directly or indirectly.

In this manner, topology information may be efficiently determined, for presentation to the network management console or for a requesting user or process for determining faults and/or maintaining the network. One additional advantage of process 350 provided in FIG. 3b is the ability to determine network topology even with the presence of devices which provide connectivity in the network, but yet, cannot provide slot/port (due to failure or inability to respond to SNMP requests) and the associated interconnection information between Nmm's. This will now be discussed.

Figure 10A:
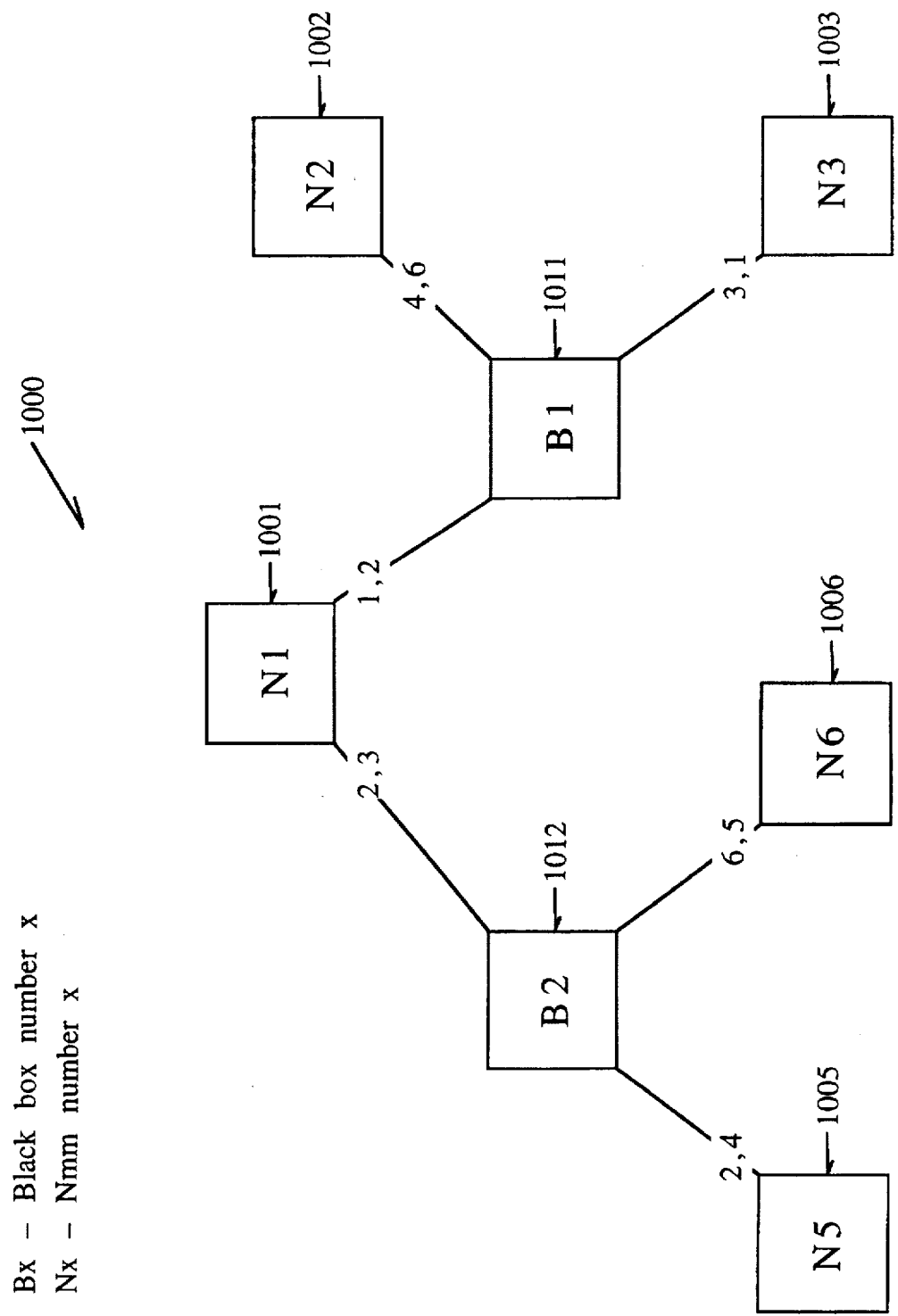

Unsupported or non-responsive devices (known as "black boxes" in implemented embodiments) are detected after the completion of process 350 of FIG. 3b. Another method for determining topology may also be used for providing interconnection information to its minimum determinable amount. In such an instance, the original link tables will not be completely empty. That is, there will be slot/port combinations for individual Nmm's which have multiple Nmm's as destination IP's. One example of such a circumstance is shown with reference to FIG. 10b wherein link entries 1020–1060 for certain slot/port combinations illustrated in FIG. 10b have multiple Nmm's as destination addresses. As is apparent by viewing FIG. 10b, there are several entries in the tables which contain more than one Nmm destination IP address. Thus, because there is more than one Nmm coupled to a single slot/port combination as is illustrated in the entries shown in FIG. 10b, it is assumed that there are unsupported or non-responding devices residing between the source network management module ($Nmm_s$) and two destination network management modules ($Nmm_d$) coupled to the single slot/port. An example topology 1000 of FIG. 10a may be represented using the entries shown in FIG. 10b. There are certain devices in the topology (e.g., B1 1011 and B2 1012) which are incapable of responding to SNMP requests. Thus, it is important to extract such a topology from the link entries shown in FIG. 10b. A process, such as that illustrated as 1100 in FIGS. 11a and 11b, is performed upon the link table entries shown in FIG. 10b in order to determine the topology.

Figure 11A:
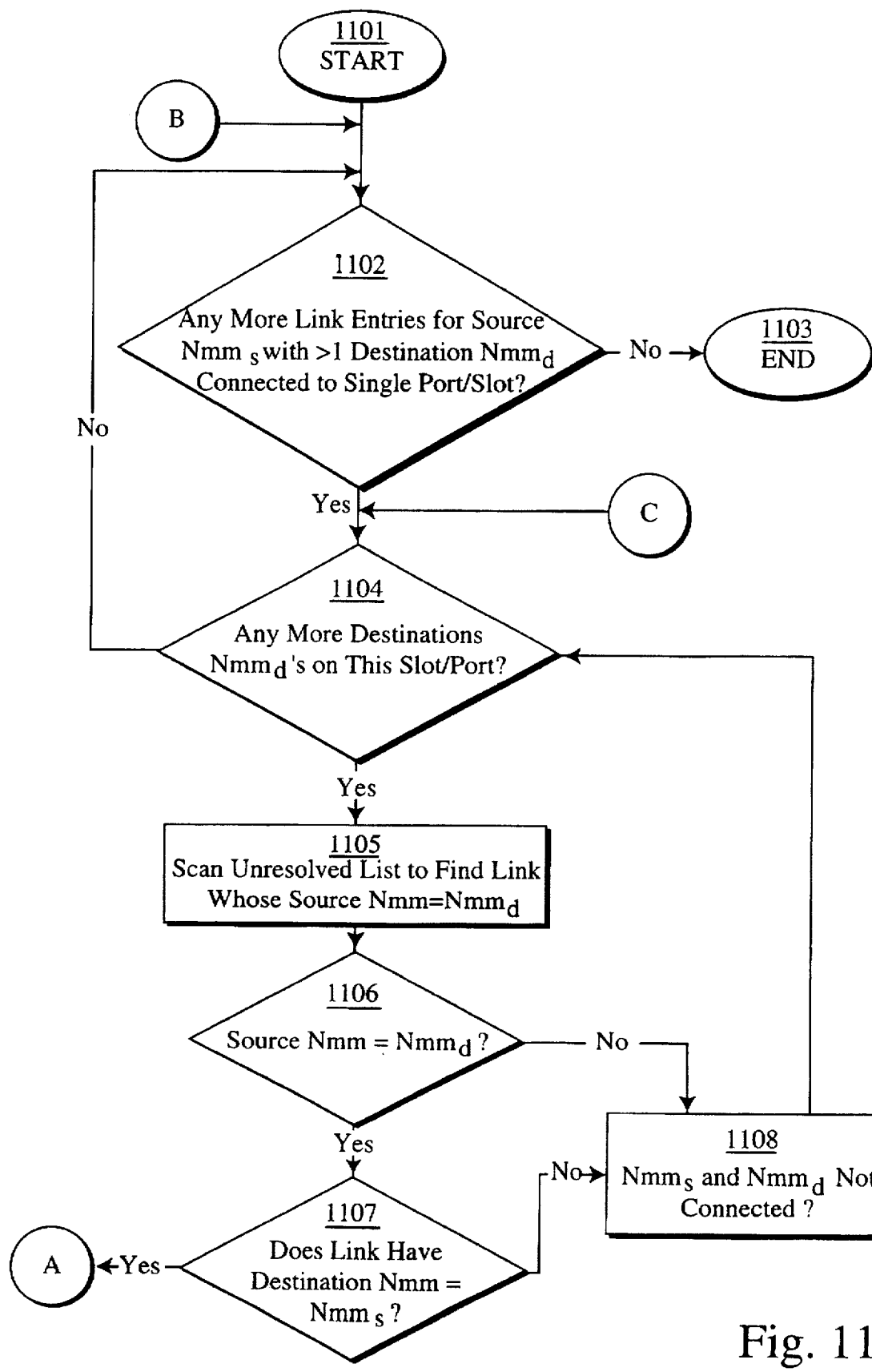
FIGS. 11a and 11b illustrate a process according to an embodiment of the invention which is used for determining topology in a system which includes nodes of an unknown type (e.g., that illustrated in FIG. 10).
Figure 11B:
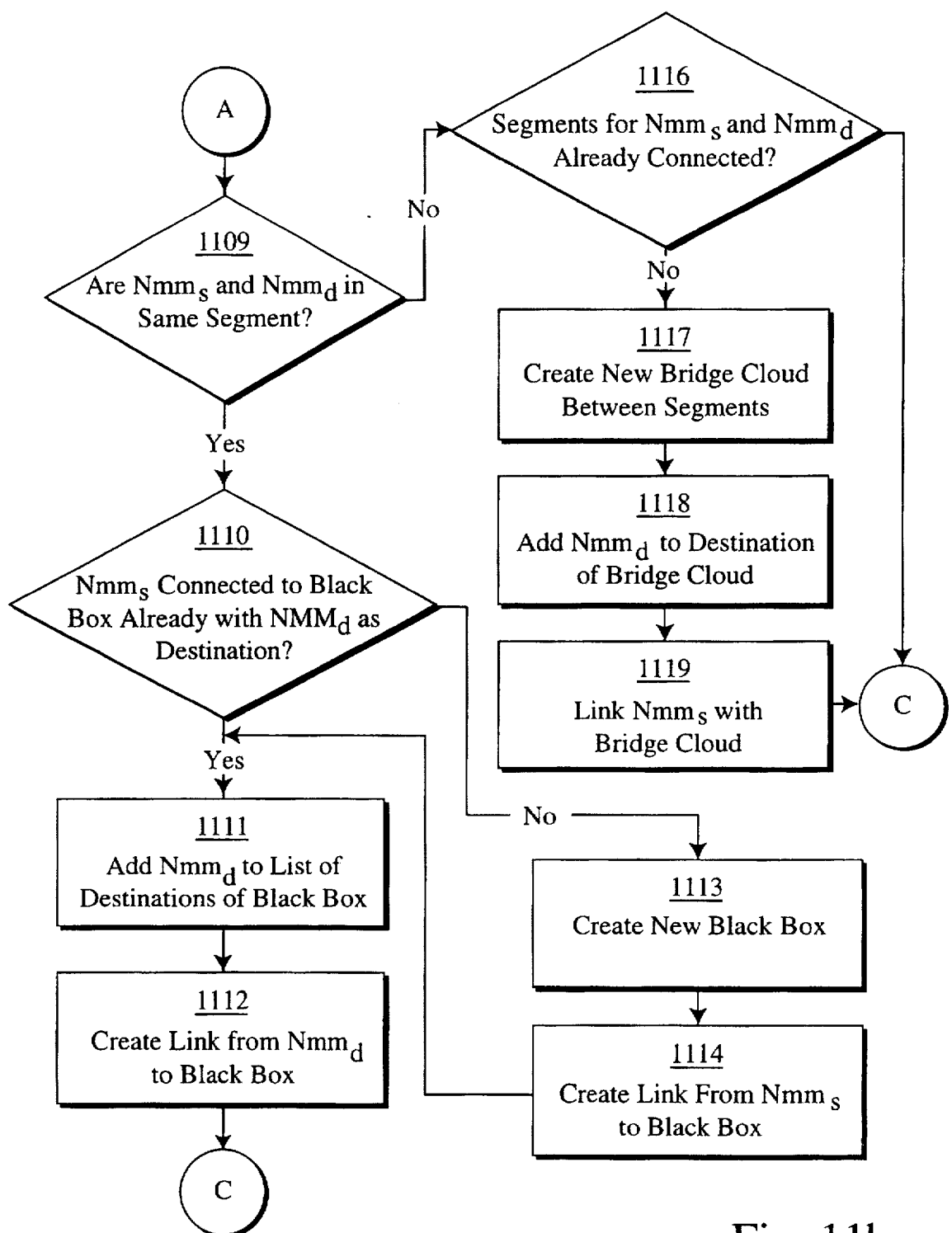

A typical process for determining the presence of unsupported or non-responsive devices in the networking system is shown as process 1100 of FIGS. 11a and 11b. Process 1100 starts at a typical process entry point such as 1101 in FIG. 11a which is commenced upon completion of a process such as 350 in FIG. 3b for reducing the number of entries in the connection table to the minimum mount. That is, this process is only performed upon completing the determination of the overall topology of the system, and there are no more unitary link entries (e.g., there are entries with more than one destination in network management module coupled to a single slot/port combination). Thus, upon entry into the process 1100, it is determined whether there are any more link entries for a particular source $Nmm_s$ with more than one destination IP address for multiple destination network management modules $Nmm_d$ connected to the single slot/port. This is detected at step 1102 of process 1100 shown in FIG. 11a. If there are no more link entries with more than one destination then process 1100 terminates at step 1103. In the topology, all black boxes have thus been determined if any.

If, however, there is an additional link entry for single source $Nmm_s$ which has more than one destination $Nmm_d$ connected to a single slot/port, then, it is determined whether there are any more destination $Nmm_d$'s on the slot/port combination being examined at step 1104. That is, the remaining steps of process 1100 are performed upon all the destination $Nmm_d$'s having multiple destinations coupled to a single slot/port. If so, then process 1100 proceeds to step 1105. At step 1105, the unresolved link list is scanned to find a link whose source Nmm is equal the destination $Nmm_d$ coupled to the single slot/port combination determined at step 1104. Once the source Nmm is determined as equal to the destination Nmm at step 1106, then it is determined whether the link has its destination Nmm equal to the source $Nmm_s$ for the particular slot/port at step 1107. If the link does not have the destination Nmm equal to the scanned-for $Nmm_s$ or the source Nmm number does not equal the $Nmm_d$ as detected at step 1106 for the link found at step 1105, then, process 1100 proceeds to step 1108 wherein it is by then established that the $Nmm_s$ and $Nmm_d$ are not connected. Then, process 1100 proceeds back to step 1104 to determine if there are any more destination $Nmm_d$'s on this slot/port.

If, however, the destination Nmm for the link is equal to the source $Nmm_s$, then process 1100 proceeds to step 1109 on FIG. 11b. At step 1109 it is determined whether the source $Nmm_s$ and the destination $Nmm_d$ are in the same segment. If not, then process 1100 proceeds to step 1116. Step 1116 determines whether the segments are already connected. If so, then process 1100 proceeds back to step 1104 of FIG. 11a. If not, however, in an implementation dependent manner, a new bridge cloud between the segments needs to be created at step 1117 linking the two Nmm's. Upon establishment of the bridge cloud between the segments, by creating an appropriate data structure entry or other element according to implementation, then, $Nmm_d$ is added to the destination of the bridge cloud at step 1118, and $Nmm_s$ is linked with the bridge at step 1119, for example by placing a bridge cloud entry in a link table for $Nmm_s$. Upon completion of these steps, step 1119 proceeds back to step 1104 and then to step 1102 of FIG. 11a, for determination of any more link entries with more than one destination $Nmm_d$ connected to a single slot/port.

If, however, the $Nmm_s$ and $Nmm_d$ are in the same segment, as detected at step 1109, then process 1100 proceeds to step 1110 to determine whether $Nmm_s$ is connected to a black box which should already have $Nmm_d$ as its destination. Like the bridge cloud, the black box is represented using a table entry or similar data structure element with some identifying type or string. If not, then process 1100 proceeds to step 1113. If so, however, then process 1100 proceeds to step 1111. In the instance of a black box already being connected to $Nmm_s$ and the black box should be connected to $Nmm_d$, then $Nmm_d$ is simply added to the list of destinations of the existing black box at step 1111. Then, a link from $Nmm_d$ to the black box is established at step 1112, and process 1100 proceeds back to step 1104 of FIG. 11a. If, however, the $Nmm_s$ is not already connected to a black box with $Nmm_d$ as its destination, then a new black box needs to be created, for example, by creating a new database entry according to the specific implementation. In this instance, the new black box is created. Process 1100 then proceeds to step 1111, to add $Nmm_d$ to the list of connections for the black box and to step 1112 to create the final link from $Nmm_d$ to the black box. Upon completion of step 1112, as previously discussed, the process returns to step 1104 of FIG. 11a.

Thus, upon completion of the process 1100 the link tables are updated to the entries shown as 1200–1260 in FIGS. 12a and 12b. Although any implementation may be used, this is shown for the purposes of consistency with the topology determination process. Link entries 1022 and 1023 in FIG. 10b have been replaced with a single entry 1202 in FIG. 12a referencing a first black box, B1, shown in the example topology of FIG. 10a as 1011. Other references are created for the black box, B1 1011 in entries 1212 and 1222 from Nmm's N2 and N3 as well. The black box entry 1250 contains three entries 1252–1254 for each of the Nmm's and N1, N2 and N3 which it references. The fields for particular unique slot/port combinations contain some predetermined value in this implementation (e.g., integer 99) because the black box is incapable of responding to the network computing engine and specifying to which slot/port they are coupled. In other implementations, other data structures may be used. Similarly, after completion of the process 1100, there is a second link entry for black box B2 shown as 1012 in FIG. 10a, this link entry 1260 containing three entries, 1262–1264, each referencing the network management modules N1, N5 and N6 shown as 1001, 1005 and 1006 in FIG. 10a. Therefore, upon the completion of process 1100, there are no multiple link entries per slot/port combination from each of the network management modules N1–N6 as clearly illustrated by viewing the link entries 1200–1240 in FIG. 12a and the topology is now complete. Thus, the present invention poses advantages over the prior art such that not only can topology be determined by performing the process 350 shown in FIG. 3b, but upon completion of that process, any non-responsive entities may be identified and handled in a manner superior to the prior art via a network management console or other device in the system for appropriate network management.

Thus, a method and apparatus which has been described here allows topology to be determined in a networking system, and which provides advantages over the prior art, including but not limited to, determination of topologies in a system which included unknown devices. Although the present invention has been described with reference to specific embodiments in this detailed description, specifically with reference to FIGS. 1–12b, these should not be viewed as limiting the present invention, and the scope of the present invention is only limited by the appended claims which follow.

What is claimed is:

1. A computer-implemented method of determining a topology of a network comprising the following steps:
   a. receiving a plurality of signals from a plurality of source hubs in said network, each of said plurality of signals containing connection information for said source hubs including information identifying destination hubs to which said source hubs are coupled, and a corresponding connection port on said source hubs through which said destination hubs are coupled;
   b. storing said connection information in a table;
   c. processing said connection information by locating unitary connections in said table and iteratively performing the following steps until there are no more said unitary connections in said table:
      i. selecting a unitary connection from said table, said unitary connection having a particular source hub and a particular destination hub;
      ii. determining return connection information in said table which has said particular destination hub as a source hub, and said particular source hub as a destination hub;
      iii. storing said unitary connection in a resolved link area;
      iv. storing said return connection information in a back link area;
      v. removing said unitary connection from said table;
   d. removing from said table all connection information that (a) has a destination hub that matches the destination hub of any given connection information in said resolved link area and (b) does not have a source hub that matches the destination hub of said given connection information in said resolved link area;
   e. removing from said table all connection information that (a) matches connection information in said back link area and (b) is the only connection information remaining in said table for a particular source hub;
   f. if said table is not empty and there are additional unitary connections in said connection information, then returning to said step c; and
   g. determining the topology of the network based on the connection information that is stored in said resolved link area and said back link area.

2. The method of claim 1 wherein said hubs comprise network management modules arranged in said topology including unique connections between each of said network management modules.

3. The method of claim 1 wherein said network comprises an ethernet networking system.

4. The method of claim 1 wherein said connection information for each of said plurality of hubs contains a source address and at least one destination address.

5. The method of claim 4 wherein said source address and said at least one destination address comprise internet protocol (IP) addresses.

6. The method of claim 1 wherein said connection port comprises a port and slot combination on said source hub.

7. The method of claim 1 wherein the connection information that is stored in said resolved link area and said back link area constitute resolved connection information, the method further comprising the steps of:
   a. determining if said resolved connection information comprises a plurality of said destination hubs for one connection port on one said source hub, and if not, then terminating, otherwise continuing;
   b. for each of said plurality of destination hubs for said one connection port:
      i. determining whether said connection information includes return connection information from said each destination hub to said source hub, and if not, then removing said connection information for said one connection port from said connection information and terminating;
      ii. establishing new connection information by linking said source hub to an unsupported hub, linking said unsupported hub to said each destination hub, and linking said destination hub to said unsupported hub in said connection information; and
      iii. removing said connection information from said source hub to said destination hub, and said connection information from said destination hub to said source hub.

8. The method of claim 7 wherein said step of establishing new connection information includes determining whether said unsupported hub in said connection information already exists, and if not, then creating unsupported connection information.

9. The method of claim 8 wherein said step of establishing new connection information includes determining whether said source and said destination hub are in the same segment, and if not, then determining whether bridge connection information exists between said destination and said source, and if not, then establishing said bridge connection information, establishing new connection information by linking said source hub to said bridge connection information, linking said bridge connection information to said each destination hub, and linking said destination hub to said bridge connection information, removing said connection information from said source hub to said destination hub, and removing said connection information from said destination hub to said source hub.

10. A method of determining topology of a network comprising source hubs which each respond with connection information indicating (i) other hubs to which they are coupled through corresponding connection ports and (ii) the corresponding connection ports through which they are coupled to the other hubs, said network including non-responsive hubs in said network, comprising the steps of:

a. determining if connection information for each source hub comprises a plurality of destination hubs for one connection port on said source hub, and if not, then terminating, otherwise continuing;

b. for each of said plurality of destination hubs for said one connection port:
   i. determining whether said connection information includes return connection information from a destination hub to said source hub, and if not, then removing said connection information for said one connection port from said connection information and terminating;
   ii. establishing new connection information by linking said source hub to an unsupported hub, linking said unsupported hub to said each destination hub, and linking said destination hub to said unsupported hub in said connection information; and
   iii. removing said connection information from said source hub to said destination hub, and said connection information from said destination hub to said source hub.

11. An apparatus for determining a topology of a network comprising:

a. receiver circuitry receiving a plurality of signals from a plurality of source hubs in said network, each of said plurality of signals containing connection information for said source hubs including information identifying destination hubs to which said source hubs are coupled, and a corresponding connection port on said source hubs through which said destination hubs are coupled;

b. memory coupled to said receiver circuitry, said connection information being stored in a table in said memory;

c. processing circuitry coupled to said memory, said processing circuitry processing said connection information by
   i. locating unitary connections in said table and executing the following operations until there are no more said unitary connections in said connection information:
      (A) selecting a unitary connection from said table, said unitary connection having a particular source hub and a particular destination hub;
      (B) determining return connection information in said table which has said particular destination hub as a source hub, and said particular source hub as a destination hub;
      (C) storing said unitary connection in a resolved link area:
      (D) storing said return connection information in a back link area;
      (E) removing said unitary connection from said table;
   ii. removing from said table all connection information that (a) has a destination hub that matches the destination hub of any given connection information in said resolved link area and (b) does not have a source hub that matches the destination hub of said even connection information in said resolved link area;
   iii. removing from said table all connection information that (a) matches connection information in said back link area and (b) is the only connection information remaining in ,said table for a particular source hub;
   iv. if said table is not empty and there are additional unitary connections in said connection information, then returning to said step i; and
   v. determining the topology of the network based on the connection information that is stored in said resolved link area and said back link area.

* * * * *